United States Patent
Lu

(10) Patent No.: US 8,199,253 B2
(45) Date of Patent: Jun. 12, 2012

(54) CLOCK RANGE SETTING DEVICE

(75) Inventor: Kuei-Ming Lu, Hsinchu County (TW)

(73) Assignee: Sunplus Technology Co., Ltd., Hsinchu (TW)

(*) Notice: Subject to any disclaimer, the term of this patent is extended or adjusted under 35 U.S.C. 154(b) by 348 days.

(21) Appl. No.: 12/701,589

(22) Filed: Feb. 7, 2010

(65) Prior Publication Data

US 2011/0122313 A1 May 26, 2011

(30) Foreign Application Priority Data

Nov. 23, 2009 (TW) ................................. 98139803 A

(51) Int. Cl.
*H04N 7/01* (2006.01)
(52) U.S. Cl. ........................................................ 348/464
(58) Field of Classification Search .................. 348/464, 348/465, 466, 460–461, 473–477, 478, 512, 348/536
See application file for complete search history.

(56) References Cited

U.S. PATENT DOCUMENTS

| | | | | |
|---|---|---|---|---|
| 5,179,438 A | * | 1/1993 | Morimoto | 348/536 |
| 5,249,050 A | * | 9/1993 | Zato | 348/478 |
| 5,301,023 A | * | 4/1994 | Zato | 348/476 |
| 5,481,370 A | * | 1/1996 | Kim | 386/201 |
| 5,532,755 A | * | 7/1996 | Patel et al. | 348/614 |
| 5,557,335 A | * | 9/1996 | Oh | 348/512 |
| 5,561,469 A | * | 10/1996 | Schultz | 348/476 |
| 5,822,008 A | * | 10/1998 | Inoue et al. | 348/446 |
| 6,839,091 B1 | | 1/2005 | Hebbalalu et al. | |
| 6,909,467 B2 | | 6/2005 | Kuzumoto et al. | |
| 2004/0061692 A1 | * | 4/2004 | Arai et al. | 345/204 |

* cited by examiner

*Primary Examiner* — Paulos Natnael
(74) *Attorney, Agent, or Firm* — Jianq Chyun IP Office

(57) ABSTRACT

A clock range setting device including a horizontal counter, a filter unit, a clock detecting unit, a first infinite impulse filter (IIR filter), and a clock range modulator is provided. The horizontal counter counts a horizontal counter value. The filter unit obtains a lead clock of each teletext video signal according to a lead clock range, and generates a corresponding clock intermediate value. The clock detecting unit detects level changes of the lead clock of each teletext video signal according to the clock intermediate value, so as to generate a corresponding current clock cycle number. The first IIR filter generates corresponding number mean value according to the current clock cycle numbers sequentially received by the first IIR filter. The clock range modulator sets the lead clock range corresponding to each teletext video signal according to the current clock cycle number, the number mean value, and the horizontal counter value.

8 Claims, 4 Drawing Sheets

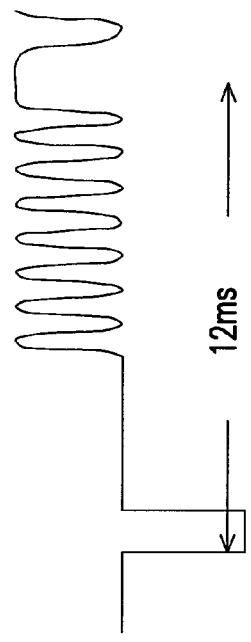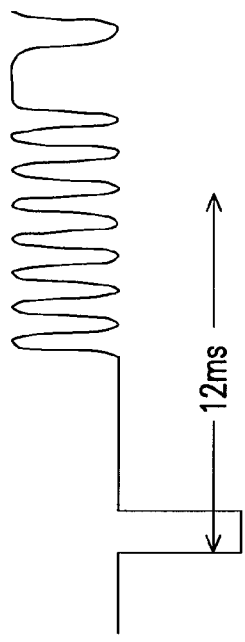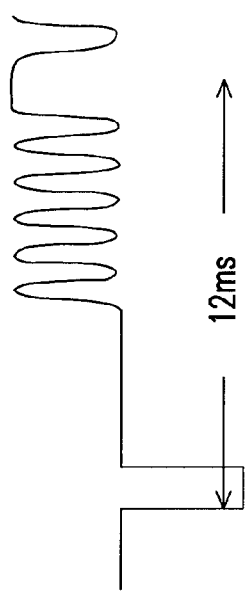

CLOCK RANGE SETTING DEVICE

CROSS-REFERENCE TO RELATED APPLICATION

This application claims the priority benefit of Taiwan application serial no. 98139803, filed on Nov. 23, 2009. The entirety of the above-mentioned patent application is hereby incorporated by reference herein and made a part of specification.

BACKGROUND OF THE INVENTION

1. Field of the Invention

The invention relates to a clock range setting device. More particularly, the invention relates to a clock range setting device capable of avoiding the erroneous bit stream due to the timing drift or the undefined number of lead clock.

2. Description of Related Art

The technology of framing the lead clock is used to expect the timing when the lead clock occurs according to the timing control signal and the text specification used in the TV broadcasting system. FIG. 1 is a schematic timing diagram of the composite teletext video signal. As shown in FIG. 1, the composite teletext video signal, for example, includes a horizontal synchronizing pulse HSY11, a color synchronous pulse CSY11, a lead clock CLK11, and a bit stream BST11. According to the enhanced teletext specification defined by the ETSI EN 300 706, for the time specification of the lead clock CLK11, the lead clock CLK11 is defined as the period from the falling edge of the horizontal synchronizing pulse HSY11 to the second last peak of the lead clock, which is about $12_{-1.0}^{+0.4}$ microseconds (us).

Generally, the receiving end of the TV broadcasting system records the number of the sample points of the composite teletext video signal according to the counter value VAL outputted by a counter. Accordingly, along with the increasing of the counter value VAL, the receiving end frames a lead clock range AR11 by setting the initial value and the final value and comparing the counter value VAL. Next, the phase locked loop (PLL) inside the receiving end locks the lead clock CLK11 in the lead clock range AR11, and the output clock of the PLL can serve as the sample clock of the bit stream BST11 later.

However, when being broadcasted in practice, the composite teletext video signal will have an offset relative to the teletext specification in response to the timing drift. FIG. 2A and FIG. 2B are schematic timing diagrams of the composite teletext video signal in response to the timing drift. For example, as shown in FIG. 2A, when the period from the falling edge of the horizontal synchronizing pulse to the second last peak of the lead clock is smaller than 11 us due to the composite teletext video signal in response to the timing drift, the lead clock range framed by the system will include the bit stream, thereby causing the erroneous synchrotron of the PLL and the erroneous bit stream. On the contrary, as shown in FIG. 2B, when the period from the falling edge of the horizontal synchronizing pulse to the second last peak of the lead clock is larger than 12.4 us due to the composite teletext video signal in response to the timing drift, the lead clock range framed by the system will simply include the lead clock. In such a case, the PLL can not be synchronous with the lead clock, thereby causing the erroneous sampling of the bit stream.

Moreover, the teletext specification has not defined a clear number of the lead clock, so that the number of the lead clock may be from 4 to 8 in an actual TV broadcasting system. In this case, as shown in FIG. 3, which is another schematic timing diagram of the composite teletext video signal, the system can not previously obtain the number of the lead clock set in each channel, so that the receiving end will frame the lead clock range by the initially set number of the lead clock, e.g. 7. Accordingly, if the number of the lead clock used in the current TV broadcasting system is 5, it will cause the erroneous synchrotron of the PLL and the erroneous bit stream.

SUMMARY OF THE INVENTION

An embodiment of the invention provides a clock range setting device capable of avoiding the erroneous bit stream of the composite teletext video signal due to the timing shift or the undefined number of the lead clock.

An embodiment of the invention provides a clock range setting device. The clock range setting device sets N lead clock ranges corresponding to N teletext video signals according to N framing codes and N horizontal synchronizing pulses, wherein N is a positive integer. The clock range setting device includes a horizontal counter, a filter unit, a clock detecting unit, a first infinite impulse response filter (IIR filter), and a clock range modulator. Herein, the horizontal counter is configured to count a horizontal counter value and reset the horizontal counter value when receiving one of the horizontal synchronizing pulses. The filter unit is configured to generate a plurality of clock intermediate values. Herein, the filter unit obtains a lead clock of the $i^{th}$ teletext video signal according to the $i^{th}$ lead clock range and averages the lead clocks of the $1^{st}$ to the $i^{th}$ teletext video signals to generate the $i^{th}$ clock intermediate value when detecting the $i^{th}$ framing code, wherein i is an integer, and $1 \leq i \leq N$.

Moreover, the clock detecting unit detects a level change of the lead clock of the $(i+1)^{th}$ teletext video signal according to the $i^{th}$ clock intermediate value, thereby generating a current number corresponding to the lead clock of the $(i+1)^{th}$ teletext video signal, and the clock detecting unit further generates the current number corresponding to the lead clock of the $1^{st}$ teletext video signal according to a predetermined intermediate value. The first IIR filter generates a plurality of number mean values. Herein, the first IIR filter averages the current clock cycle numbers of the lead clocks of the $1^{st}$ to the $i^{th}$ teletext video signals to generate the $i^{th}$ number mean value when detecting the $i^{th}$ framing code. The clock range modulator is configured to set an end position of the $(i+1)^{th}$ lead clock range according to the current number of the lead clock of the $(i+1)^{th}$ teletext video signal and the $i^{th}$ number mean value, and the clock range modulator is configured to set an initial position of the $(i+1)^{th}$ lead clock range when the horizontal counter value reaches to a range initial value, wherein the clock range modulator further feeds the $(i+1)^{th}$ lead clock range back to the filter unit.

In an embodiment of the invention, the clock range modulator sets the end position of the $1^{st}$ lead clock range according to an internally set predetermined clock number and the current clock cycle number of the lead clock of the $1^{st}$ teletext video signal, and the clock range modulator sets the initial position of the $1^{st}$ lead clock range when the horizontal counter value reaches to the range initial value.

In an embodiment of the invention, the clock range modulator sets the end position of the $(i+2)^{th}$ lead clock range when the current clock cycle number of the lead clock of the $(i+1)^{th}$ teletext video signal is not countered to the $(i+1)^{th}$ number mean value yet, and the horizontal counter value reaches to a safe limit value.

In an embodiment of the invention, the clock range setting device includes a safety limiter and a third IIR filter. The safety limiter is configured to generate a plurality of range final values, wherein the safety limiter reads the horizontal counter value when the safety limiter detects the $i^{th}$ framing code, and the safety limiter subtracts a predetermined offset from the read horizontal counter value to generate the $i^{th}$ range final value. The third IIR filter is configured to generate the safe limit value according to the $1^{st}$ to the $i^{th}$ range final values when the third IIR filter detects the $(i+1)^{th}$ framing code.

Based on the above, in the embodiments of the invention, the level change of the lead clock is determined according to the clock intermediate value accumulated by the filter unit, thereby generating the current clock cycle number of each lead clock. Accordingly, in the embodiments of the invention, the end position of each lead clock range is set according to the number mean value accumulated of the lead clock. Therefore, the erroneous bit stream of the composite teletext video signal due to the timing drift is avoided in the embodiments of the invention. Moreover, by the safety limiter, the erroneous bit stream of the composite teletext video signal due to the undefined number of lead clock is also avoided in the embodiments of the invention.

To make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A and FIG. 2B are schematic timing diagrams of the composite teletext video signal in response to the timing shift.

FIG. 3 is another schematic timing diagram of the composite teletext video signal.

DESCRIPTION OF EMBODIMENTS

Figure 1:
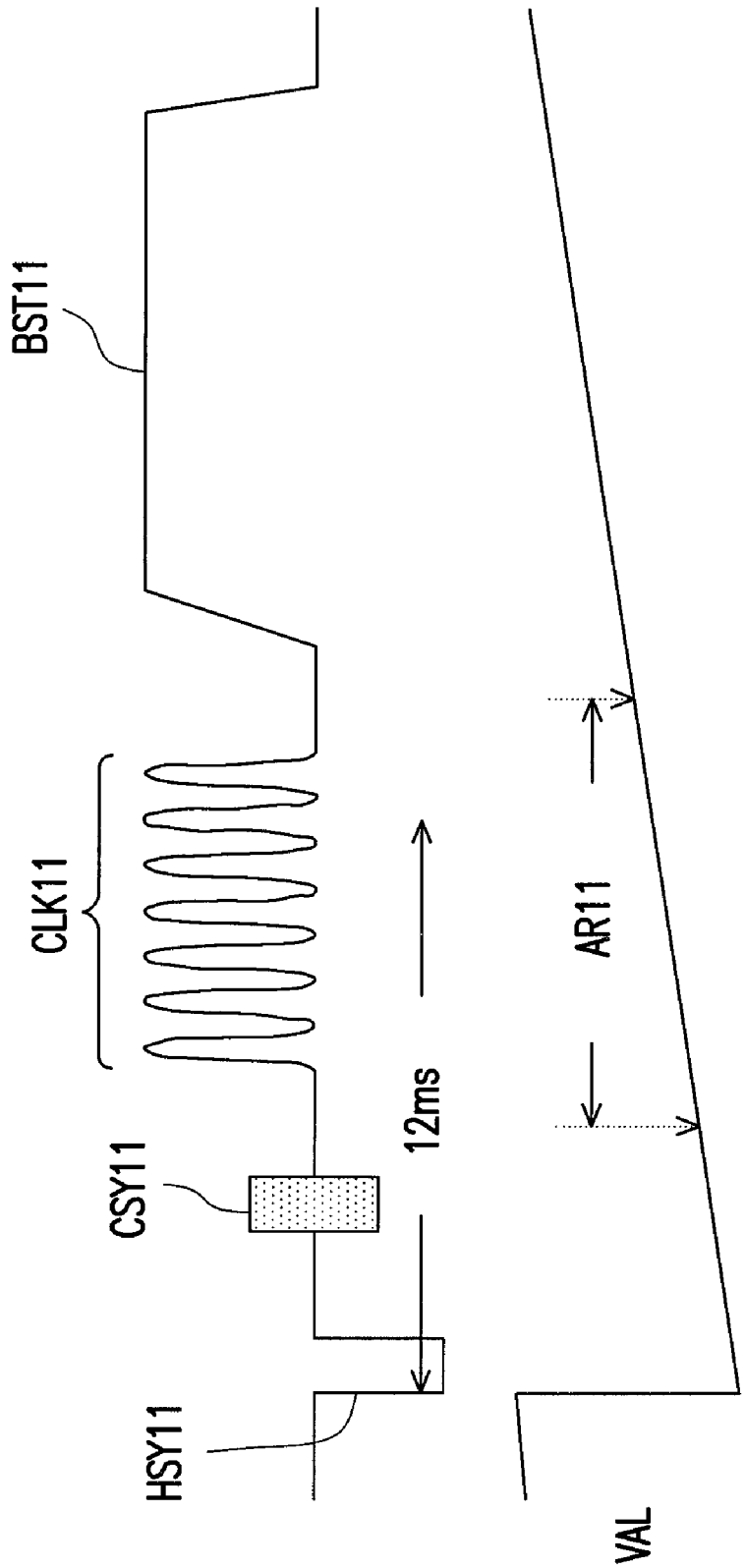
FIG. 1 is a schematic timing diagram of the composite teletext video signal.
Figure 4:
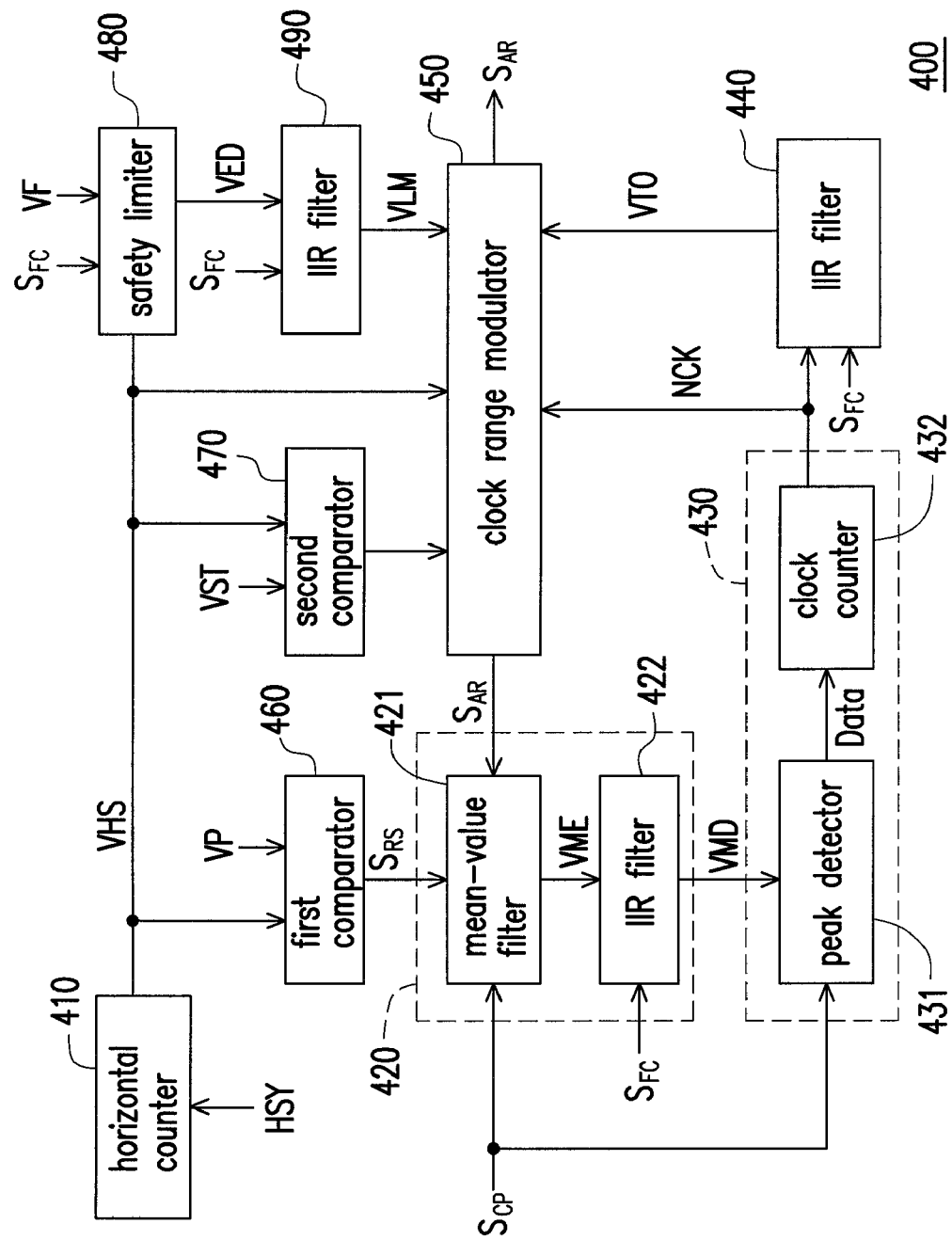
FIG. 4 is a block diagram of a clock range setting device according to an embodiment of the invention.
Figure 5:
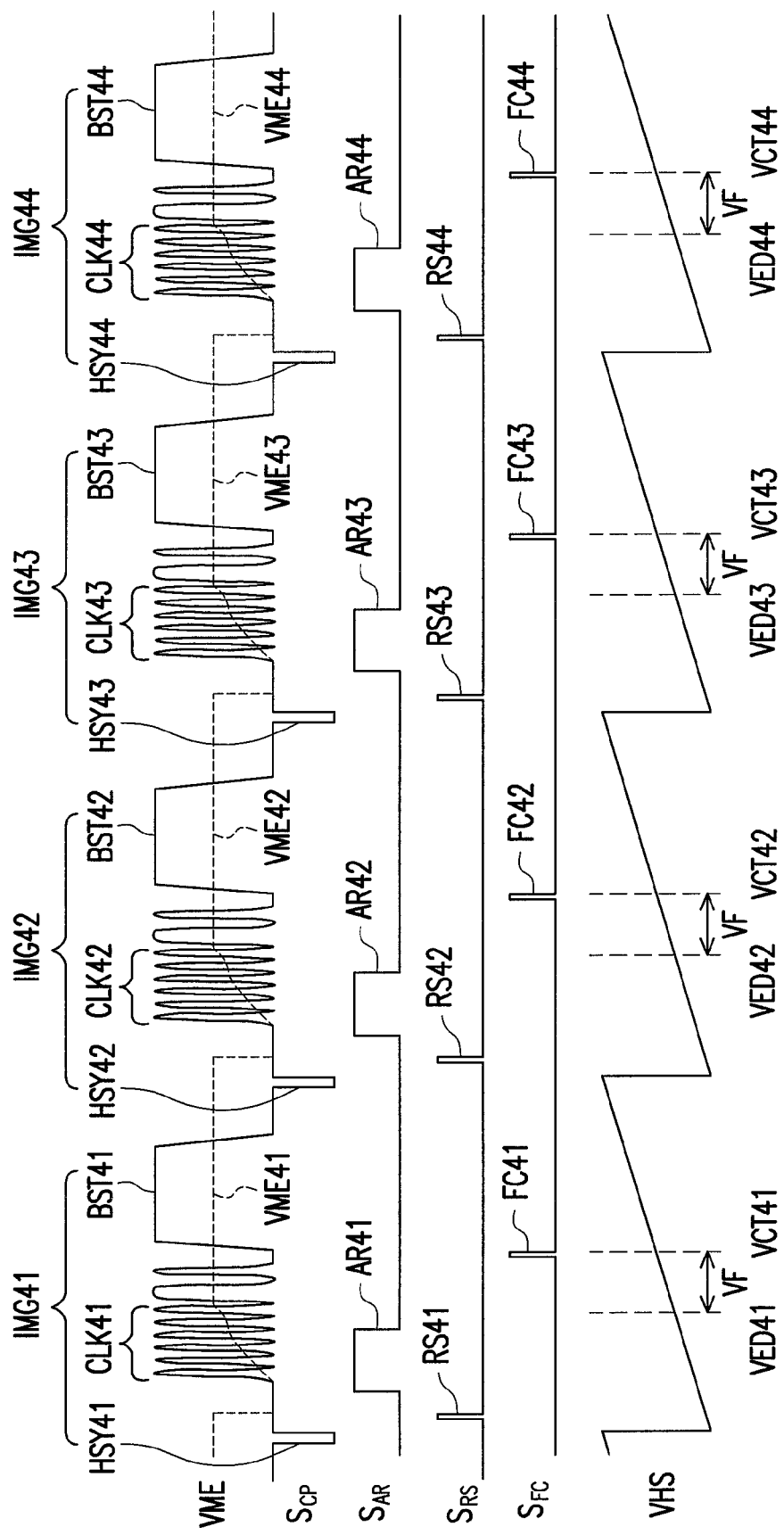
FIG. 5 is a timing waveform diagram for illustrating the embodiment of FIG. 4.

FIG. 4 is a block diagram of a clock range setting device according to an embodiment of the invention. FIG. 5 is a timing waveform diagram of the clock range setting device in FIG. 4. Referring FIG. 4, the clock range setting device 400 includes a horizontal counter 410, a filter unit 420, a clock detecting unit 430, an infinite impulse response filter (IIR filter) 440, a clock range modulator 450, a first comparator 460, and a second comparator 470. Herein, the filter unit 420 includes a mean-value filter 421 and an IIR filter 422, and the clock detecting unit 430 includes a peak detector 431 and a clock counter 432.

Referring to FIG. 5, the composite teletext video signal $S_{CP}$ received by the clock range setting device 400 is a signal sampled by an analog-to-digital (A/D) converter, and the color synchronic signal is filtered. Herein, it is supposed that a field teletext video signal includes N ($1 \leq N \leq 18$) teletext video signals, and each of the teletext video signals includes a horizontal synchronizing pulse, a lead clock, and a bit stream. For example, FIG. 5 illustrates four teletext video signals, wherein the $1^{st}$ teletext video signal IMG41 includes the horizontal synchronizing pulse HSY41, the lead clock CLK41, and the bit stream BST41, the $2^{nd}$ teletext video signal IMG42 includes the horizontal synchronizing pulse HSY42, the lead clock CLK42, and the bit stream BST42, and so on.

In the operation, the clock range setting device 400 is configured to generate the lead clock range signal $S_{AR}$ required while framing the lead clock. Herein, the lead clock range signal $S_{AR}$ includes a plurality of lead clock ranges AR41~AR44 respectively corresponding to the plurality of lead clocks CLK41~CLK44 in the composite teletext video signal $S_{CP}$. For example, the lead clock range AR41 in the lead clock range signal $S_{AR}$ is used to frame the lead clock CLK41, and the lead clock range AR42 in the lead clock range signal $S_{AR}$ is used to frame the lead clock CLK42.

In following, how the clock range setting device 400 sets the lead clock range corresponding to the lead clock of each teletext video signal will be described in detail. Referring to FIG. 4 and FIG. 5, the horizontal counter 410 is configured to count a horizontal counter value VHS and reset the horizontal counter value VHS when receiving a horizontal synchronizing pulse HYS. For example, while the clock range setting device 400 receives the horizontal synchronizing pulses HSY41~HSY44, the horizontal counter 410 recounts the horizontal counter value VHS. In other words, during each horizontal scan period, the horizontal counter 410 is reset and recounts the horizontal counter value VHS later for each of the teletext video signals.

The first comparator 460 is configured to generates a reset signal $S_{RS}$, wherein the reset signal $S_{RS}$ includes a plurality of filter resetting pulses RS41~RS44. Herein, the first comparator 460 compares the horizontal counter value VHS and a predetermined value VP, and outputs a filter resetting pulse when the horizontal counter value VHS reaches to the predetermined value VP. Accordingly, during each horizontal scan period, the first comparator 460 outputs a filter resetting pulse. For example, between the horizontal synchronizing pulses HSY41 and HSY42, the first comparator 460 outputs the filter resetting pulse RS41.

Moreover, the second comparator 470 compares the horizontal counter value VHS and a range initial value VST, and outputs a range initial pulse when the horizontal counter value VHS reaches to the range initial value VST. Therefore, during the horizontal scan period in which the teletext video signal is received, the second comparator 470 outputs a range initial pulse. Accordingly, the clock range modulator 450 sets the initial position of the corresponding lead clock range while detecting the range initial pulse.

It should be noted that, when the clock range setting device 400 receives the $1^{st}$ teletext video signal IMG41, the clock range modulator 450 first sets the end position of the $1^{st}$ lead clock range AR41 according to an internally set predetermined clock number. For example, if the predetermined clock number set by the clock range modulator 450 is four, the $1^{st}$ lead clock range exactly corresponds to the lead clock CLK41 of the $1^{st}$ teletext video signal IMG41, as shown in FIG. 5.

The mean-value filter 421 of the filter unit 420 resets a mean-value VME of the lead clock while detecting the filter resetting pulse RS41. Next, the mean-value filter 421 obtains the lead clock CLK41 of the $1^{st}$ teletext video signal IMG41 according to the $1^{st}$ lead clock range AR41, thereby generating the mean-value VME41 of the lead clock CLK41. Moreover, the IIR filter 422 of the filter unit 420 generates the $1^{st}$ clock intermediate value VMD(1) according to the mean-value VME41 of the lead clock CLK41 of the $1^{st}$ teletext video signal while detecting the $1^{st}$ framing code FC41 of the framing code signal $S_{FC}$.

Furthermore, for the clock detecting unit 430, at the start, when the $1^{st}$ teletext video signal IMG41 is inputted to the clock detecting unit 430, i.e. the $1^{st}$ clock intermediate value VMD(1) has not been generated yet, the clock detecting unit 430 generates the current clock cycle number NCK(1) of the $1^{st}$ lead clock CLK41 according to a predetermined intermediate value which is internally set therein. At this time, the IIR filter 440 receives the current clock cycle number NCK(1) of the $1^{st}$ lead clock CLK41 when detecting the $1^{st}$ framing code FC41, thereby generating the $1^{st}$ number mean value VTO(1).

Next, when the $2^{nd}$ teletext video signal IMG42 is inputted to the clock detecting unit 430, i.e. the $1^{st}$ clock intermediate value VMD(1) has been generated, the peak detector 431 detects the level change of the lead clock CLK42 of the $2^{nd}$ teletext video signal IMG42 according to the $1^{st}$ clock intermediate value VMD(1), thereby generating the $2^{nd}$ level change data Data(2). Moreover, the clock counter 432 generates the current clock cycle number NCK(2) of the lead clock CLK42 of the $2^{nd}$ teletext video signal IMG42 according to the $2^{nd}$ level change data Data(2). In addition, when detecting the $2^{nd}$ framing code FC42, the IIR filter 440 receives the current clock cycle number NCK(2) of the $2^{nd}$ lead clock CLK42, and thereby generates the $2^{nd}$ number mean value VTO(2). Herein, the $2^{nd}$ number mean value VTO(2) is obtained by averaging the current clock cycle numbers NCK(1) to NCK(2) of the lead clocks CLK41 to CLK42.

In other words, after processing the $1^{st}$ teletext video signal IMG41, the filter unit 420 simply provides the clock intermediate value VMD to the clock detecting unit 430. On the contrary, for the clock detecting unit 430, at the start, i.e. when the $1^{st}$ teletext video signal IMG41 is inputted, the clock detecting unit 430 generates the $1^{st}$ current clock cycle number NCK(1) according to a predetermined intermediate value. Next, for the teletext video signal IMG received after the $1^{st}$ teletext video signal IMG41, the clock detecting unit 430 generates the current clock cycle number NCK according to the clock intermediate value VMD provided by the filter unit 420. Furthermore, for the IIR filter 440, it gradually generates the corresponding number mean value VTO according to each current clock cycle number NCK.

That is, the feedback mechanism formed by the filter unit 420, the clock detecting unit 430, the IIR filter 440, and the clock range modulator 450 fully operates after the $1^{st}$ teletext video signal IMG41. Herein, while the teletext video signals IMG41 is processed, the clock range modulator 450 first sets the end position of the lead clock range AR41 according to the internally set predetermined clock number and the $1^{st}$ current clock cycle number NCK(1). Moreover, when the $2^{nd}$ teletext video signal IMG42 is inputted, the clock detecting unit 430 has generated the current clock cycle number NCK(2) of the $2^{nd}$ lead clock CLK42 according to the $1^{st}$ clock intermediate value VMD(1) and the IIR filter 440 has generated the $1^{st}$ number mean value VTO(1). Accordingly, as the $2^{nd}$ teletext video signal IMG42 is inputted, the clock range modulator 450 can set the end position of the $2^{nd}$ lead clock range AR42 according to the $1^{st}$ number mean value VTO(1) and the $2^{nd}$ current clock cycle number NCK(2).

Similarly, when the $3^{rd}$ teletext video signal IMG43 is inputted, the clock range modulator 450 sets the initial position of the $3^{rd}$ lead clock range AR43 while detecting the range initial pulse. At this time, the mean-value filter 421 of the filter unit 420 starts to obtain the lead clock CLK43 of the $3^{rd}$ teletext video signal IMG43 according to the $3^{rd}$ lead clock range AR43 fed back by the clock range modulator 450, and the mean-value filter stops obtaining the lead clock CLK43 of the $3^{rd}$ teletext video signal IMG43 after the clock range modulator 450 has set the end position of the $3^{rd}$ lead clock range AR43.

Accordingly, the mean-value filter 421 obtains the lead clock CLK43 of the $3^{rd}$ teletext video signal IMG43 according to the $3^{rd}$ lead clock range AR43, thereby generating the mean-value VME43 of the lead clock CLK43 of the $3^{rd}$ teletext video signal IMG43. That is, for the feedback mechanism of the clock range setting device 400, the mean-value filter 421 obtains the lead clock of the $i^{th}$ teletext video signal according to the $i^{th}$ lead clock range fed back by the clock range modulator, thereby generating a mean-value of the lead clock of the $i^{th}$ teletext video signal.

Moreover, the IIR filter 422 generates the $3^{rd}$ clock intermediate value VMD(3) according to the mean-values VME41~VME43 of the lead clocks CLK41~CLK43 of the $1^{st}$ to the $3^{rd}$ teletext video signals when the IIR filter 422 detects the $3^{rd}$ framing code FC43. That is, the IIR filter 422 generates the $i^{th}$ clock intermediate value according to the mean-values of the lead clocks of the $1^{st}$ to the $i^{th}$ teletext video signals when detecting the $i^{th}$ framing code. It should be noted that, while processing the $3^{rd}$ teletext video signal IMG43, the filter unit 420 also provides the previous clock intermediate value, i.e. the $2^{nd}$ clock intermediate value VMD(2), to the clock detecting unit 430.

Accordingly, when the $3^{rd}$ teletext video signal IMG43 is inputted to the clock detecting unit 430, the peak detector 431 detects the level change of the lead clock CLK43 of the $3^{rd}$ teletext video signal IMG43 according to the $2^{nd}$ clock intermediate value VMD(2), i.e. the mean-value which is obtained by averaging the lead clocks of the $1^{st}$ to the $2^{nd}$ teletext video signals, thereby generating the $3^{rd}$ level change data Data(3). That is, the peak detector 431 detects the level change of the lead clock of the $(i+1)^{th}$ teletext video signal according to the $i^{th}$ clock intermediate value, i.e. the mean-value which is obtained by averaging the lead clocks of the $1^{st}$ to the $i^{th}$ teletext video signals, thereby generating the $(i+1)^{th}$ level change data. Moreover, the clock counter 432 generates the current clock cycle number NCK(3) corresponding to the lead clock CLK43 of the $3^{rd}$ teletext video signal IMG43 according to the $3^{rd}$ level change data Data(3). That is, the clock counter 432 generates the current clock cycle number corresponding to the lead clock of the $i^{th}$ teletext video signal according to the $i^{th}$ level change data.

It should be noted that, before the $3^{rd}$ teletext video signal IMG43 is inputted, the IIR filter 440 has generated the $2^{nd}$ number mean value VTO(2) according to the $2^{nd}$ framing code FC42, wherein the $2^{nd}$ number mean value VTO(2) is obtained by averaging the current clock cycle numbers NCK(1) to NCK(2) of the lead clocks CLK41 to CLK42. Accordingly, for the $3^{rd}$ teletext video signal IMG43, the clock range modulator 450 sets the end position of the $3^{rd}$ lead clock range AR43 according to the current clock cycle number of the $3^{rd}$ lead clock CLK43 and the $2^{nd}$ number mean value VTO(2), and feeds the $3^{rd}$ lead clock range AR43 back to the filter unit 420. Herein, the clock range modulator 450 sets the end position of the $3^{rd}$ lead clock range AR43 when the current clock cycle numbers of the $3^{rd}$ lead clock CLK43 is counted to the $2^{nd}$ number mean value VTO(2). Accordingly, the filter unit 420 can stop obtaining the lead clock CLK43 of the $3^{rd}$ teletext video signal IMG43 according to the end position of the $3^{rd}$ lead clock range AR43 set by the clock range modulator 450, and in such a manner, the same operation of the filter unit 420 for the other teletext video signals can be obtained.

Moreover, as the teletext video signals which are processed increases, the number mean value VTO provided by the IIR filter 440 gradually approaches to the number mean value of the plurality of lead clocks in the composite teletext video signal $S_{CP}$. Accordingly, the clock range modulator 450 can set the end position of each lead clock range according to the number mean value VTO, so that the erroneous bit stream of the composite teletext video signal due to the undefined clock number of the lead clock is avoided.

Furthermore, in order to prevent the current clock cycle number of the lead clock of the composite teletext video signal $S_{CP}$ from being suddenly smaller than the number mean value VTO, a safety limiter is further disposed in the clock range setting device 400 to prevent the missing line.

Referring to FIG. 4 and FIG. 5, the clock range setting device 400 includes a safety limiter 480 and a third IIR filter 490. Herein, the safety limiter 480 reads the horizontal counter value VHS when detecting the $1^{st}$ framing code FC41, and the safety limiter 480 subtracts a predetermined offset VF from the read value VCT41 of the read horizontal counter value VHS to generate the $1^{st}$ range final value VED41. Similarly, the safety limiter 480 also utilizes the read value VCT 42 of the horizontal counter value VHS and the predetermined offset VF to generate the $2^{nd}$ range final value VED42 when detecting the $2^{nd}$ framing code FC42. Accordingly, the corresponding relationships between the timings VCT43~VCT44 and the range final value VED43~VED44 can be obtained.

Moreover, the IIR filter 490 generates the safe limit value VLM according to the $1^{st}$ range final value VED41 when detecting the $2^{nd}$ framing code FC42. Similarly, the IIR filter 490 generates the safe limit value VLM according to the $1^{st}$ and $2^{nd}$ range final values VED41 and VED 42 when detecting the $3^{rd}$ framing code FC43. Accordingly, along with the continuous input of the teletext video signals, the safe limit value VLM generated by the IIR filter 490 gradually approaches to the mean end position of the plurality of lead clocks according to the horizontal counter value VHS.

Hence, when the current clock cycle number of the lead clock is suddenly smaller than the number mean value, i.e. when the current clock cycle number of the lead clock of the teletext video signal can not be counted to the number mean value VTO, the clock range modulator 450 can set the end position of the lead clock range by using the horizontal counter value VHS which has been approached to the safe limit value VLM. Accordingly, the missing line is prevented.

Therefore, in the embodiments of the invention, the level change of the lead clock is determined according to the clock intermediate value accumulated during the lead clock to thereby generate the current clock cycle number of each lead clock. As a result, even if the drift of the composite teletext video signal is increased along with the time, the current clock cycle number of each lead clock can also be exactly determined by using the clock intermediate value in the embodiments of the invention. Moreover, the end position of each lead clock range is set according to the number mean values accumulated of the lead clocks. Accordingly, the erroneous bit stream due to the undefined number of the lead clock is avoided in the embodiments of the invention.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. A clock range setting device, setting N lead clock ranges corresponding to N video signals according to N framing codes and N horizontal synchronizing pulses, wherein N is a positive integer, the clock range setting device comprising:
   a horizontal counter configured to count a horizontal counter value and reset the horizontal counter value when the horizontal counter receives one of the horizontal synchronizing pulses;
   a filter unit generating a plurality of clock intermediate values, the filter unit obtaining a lead clock of the $i^{th}$ teletext video signal according to the $i^{th}$ lead clock range, and the filter unit averaging the lead clocks of the $1^{st}$ to the $i^{th}$ teletext video signals to generate the $i^{th}$ clock intermediate value when the filter unit detects the $i^{th}$ framing code, wherein i is an integer, and $1 \leq i \leq N$;
   a clock detecting unit detecting a level change of the lead clock of the $(i+1)^{th}$ teletext video signal according to the $i^{th}$ clock intermediate value, thereby generating a current clock cycle number corresponding to the lead clock of the $(i+1)^{th}$ teletext video signal, and the clock detecting unit further generating the current clock cycle number corresponding to the lead clock of the $1^{st}$ teletext video signal according to a predetermined intermediate value;
   a first infinite impulse response filter (IIR filter) generating a plurality of number mean values, and the first IIR filter averaging the current clock cycle numbers of the lead clocks of the $1^{st}$ to the $i^{th}$ teletext video signals to generate the $i^{th}$ number mean value when the first IIR filter detects the $i^{th}$ framing code; and
   a clock range modulator configured to set an end position of the $(i+1)^{th}$ lead clock range according to the current clock cycle number of the lead clock of the $(i+1)^{th}$ teletext video signal and the $i^{th}$ number mean value, and the clock range modulator configured to set an initial position of the $(i+1)^{th}$ lead clock range when the horizontal counter value reaches to a range initial value, wherein the clock range modulator further feeds the $(i+1)^{th}$ lead clock range back to the filter unit.

2. The clock range setting device as claimed in claim 1, wherein the clock range modulator sets the end position of the $1^{st}$ lead clock range according to an internally set predetermined clock number and the current clock cycle number of the lead clock of the $1^{st}$ teletext video signal, and the clock range modulator sets the initial position of the $1^{st}$ lead clock range when the horizontal counter value reaches to the range initial value.

3. The clock range setting device as claimed in claim 1, wherein the filter unit comprises:
   a mean-value filter configured to obtain the lead clock of the $i^{th}$ teletext video signal according to the $i^{th}$ lead clock range fed back by the clock range modulator, thereby generating a mean-value of the lead clock of the $i^{th}$ teletext video signal; and
   a second infinite impulse response filter (IIR filter) configured to generate the $i^{th}$ clock intermediate value according to the mean-values of the lead clocks of the $1^{st}$ to the $i^{th}$ teletext video signals when the second IIR filter detects the $i^{th}$ framing code.

4. The clock range setting device as claimed in claim 3, further comprising:
   a first comparator configured to compare the horizontal counter value and a predetermined value to output a filter resetting pulse when the horizontal counter value reaches to the predetermined value, wherein the mean-value filter is reset when the mean-value filter detects the filter resetting pulse.

5. The clock range setting device as claimed in claim 1, wherein the clock detecting unit comprises:

a peak detector configured to generate a plurality of level change data, wherein the peak detector detects the level change of the lead clock of the $(i+1)^{th}$ teletext video signal according to the $i^{th}$ clock intermediate value, thereby generating the $(i+1)^{th}$ level change data, and the peak detector further detects the level change of the lead clock of the $1^{st}$ teletext video signal according to the predetermined intermediate value, thereby generating the $1^{st}$ level change data; and a clock counter configured to generate the current clock cycle number corresponding to the lead clock of the $(i+1)^{th}$ teletext video signal according to the $i^{th}$ level change data.

6. The clock range setting device as claimed in claim 1, further comprising:

a second comparator configured to compare the horizontal counter value and the range initial value to output a range initial pulse when the horizontal counter value reaches to the range initial value, wherein the clock range modulator sets the initial position of one of the lead clock ranges when the clock range modulator detects the range initial pulse.

7. The clock range setting device as claimed in claim 1, wherein the clock range modulator sets the end position of the $(i+2)^{th}$ lead clock range when the current number of the lead clock of the $(i+1)^{th}$ teletext video signal is not countered to the $(i+1)^{th}$ number mean value yet, and the horizontal counter value reaches to a safe limit value.

8. The clock range setting device as claimed in claim 6, further comprising:

a safety limiter configured to generate a plurality of range final values, wherein the safety limiter reads the horizontal counter value when the safety limiter detects the $i^{th}$ framing code, and the safety limiter subtracts a predetermined offset from the read horizontal counter value to generate the $i^{th}$ range final value; and a third infinite impulse response filter (IIR filter) configured to generate the safe limit value according to the $1^{st}$ to the $i^{th}$ range final values when the third IIR filter detects the $(i+1)^{th}$ framing code.

\* \* \* \* \*